United States Patent [19]

Robinson et al.

[11] 4,136,579

[45] Jan. 30, 1979

[54] FORCE LEVER ATTACHMENT FOR HAND TOOLS

[76] Inventors: Merle W. Robinson, 109 College Dr.; Lynn M. Robinson, 512 N. Streeter, both of Hesston, Kans. 67062

[21] Appl. No.: 761,641

[22] Filed: Jan. 24, 1977

[51] Int. Cl.2 .................... G05G 1/04; B23B 47/00; B23B 39/00

[52] U.S. Cl. .................... 74/523; 173/36; 408/72 R; 408/136; 408/241 R; 408/712

[58] Field of Search .................... 74/544, 551, 557, 480, 74/520, 523; 408/79, 136, 712, 129, 72 R, 241; 173/36

[56] References Cited

U.S. PATENT DOCUMENTS

| | | | |
|---|---|---|---|
| 595,896 | 12/1897 | Dusen et al. | 408/136 |
| 1,684,514 | 9/1928 | Phillips | 173/36 X |
| 2,140,854 | 12/1938 | Schnebly | 408/72 |
| 2,405,110 | 8/1946 | Bullock | 173/36 X |
| 2,466,965 | 4/1949 | Pitts | 408/99 |
| 2,625,063 | 1/1953 | Hanson | 408/712 X |
| 2,716,019 | 8/1955 | Shacikoski | 173/36 X |
| 2,879,677 | 3/1959 | Baublitz | 408/136 X |
| 2,925,001 | 2/1960 | Johnson | 408/99 |
| 2,947,204 | 8/1960 | Pine et al. | 408/129 X |
| 3,552,239 | 1/1971 | Yeaman et al. | 408/136 |

FOREIGN PATENT DOCUMENTS

| | | | |
|---|---|---|---|
| 2220112 | 1/1973 | Fed. Rep. of Germany | 408/136 |

*Primary Examiner*—Samuel Scott
*Assistant Examiner*—Don E. Ferrell
*Attorney, Agent, or Firm*—Schmidt, Johnson, Hovey & Williams

[57] ABSTRACT

A power drill attachment for exerting pressure through the drill bit onto the workpiece has a toggle linkage to provide a mechanical advantage of such sensitivity as to permit the operator to easily and quickly control the amount of pressure being exerted throughout the drilling operation. The attachment is especially adapted for use when drilling holes in door and window frames, through floor joists, studs, rafters and other building framework.

10 Claims, 8 Drawing Figures

FORCE LEVER ATTACHMENT FOR HAND TOOLS

Hand instruments such as drills available on the market are constructed so that the necessary working force must be applied at the bit manually by the instrument operator. However, under many working conditions, it becomes extremely inconvenient and oftentimes impossible to apply such manual working forces to the hand instrument.

For example, it is common practice to bore clearance holes for electrical wiring, conduits, and pipes in the floor joists and wall studs of frame buildings. In this connection, since the joists and studs are arranged in parallel, closely spaced (typically on 16 in. centers) relationship, the operator must assume a contorted, unnatural and tiresome position to apply the necessary working force when drilling holes in these parallel members. This cumbersome procedure is extremely expensive and time-consuming, thus adversely affecting the efficiency of the operator.

In an effort to overcome the above-mentioned problems, a few force applying devices have been suggested as evidenced by the U.S. Pat. No. 595,896 issued to Van Dusen and Rover and U.S. Pat. No. 2,879,677 issued to Baublitz. Van Dusen utilizes a leaf spring lever for applying a working force, while Baublitz discloses a parallel linkage arrangement including a lever for effecting a drilling force on the work surface. The arrangement of Van Dusen is undesirable inasmuch as the drilling force on the drill bit will inherently decrease as the bit progresses through the member being drilled. The device of Baublitz is cumbersome in that it is not capable of readily adapting to varying spacing between joists or studs and the actuating lever is arranged such that a force must be applied in a direction opposite to the drilling direction. Additionally, neither the Van Dusen nor Baublitz device is capable of operating between abutments which extend perpendicularly to one another.

Other prior art patents include the following: Kikuchi, U.S. Pat. No. 3,834,828; Pine et al., U.S. Pat. No. 2,947,204; Connell, U.S. Pat. No. 1,852,736; Kuta, U.S. Pat. No. 2,617,455; Morrell, U.S. Pat. No. 2,889,723; Piersall, U.S. Pat. No. 2,737,065.

It is therefore an important object of the present invention to provide for structure in connection with a drill bit or other hand tool which will permit the operator to quickly, easily, and conveniently apply the necessary pressure between a pair of abutments, progressively and to such extent desired or required throughout the drilling or comparable operation.

Another important object of our present invention is to take advantage of a toggle linkage arrangement in such way as to apply the forces by the simple expedient on the part of the operator of swinging the links at the knee of the joint through use of a hand lever, thereby effecting substantial forces with minimal energy.

Figure 1:
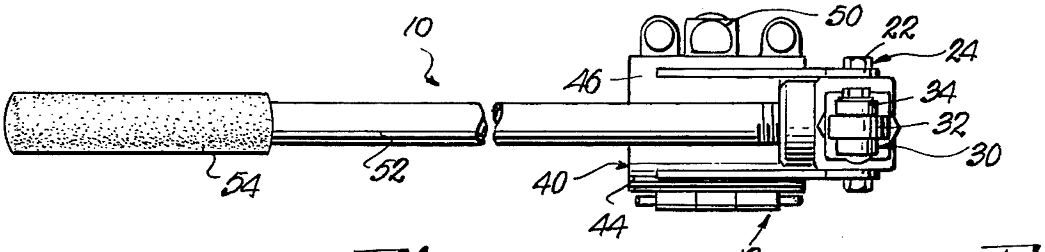
FIG. 1 is a top plan view one embodiment of a force lever attachment for hand tools constructed in accordance with the principles of the present invention.
Figure 2:
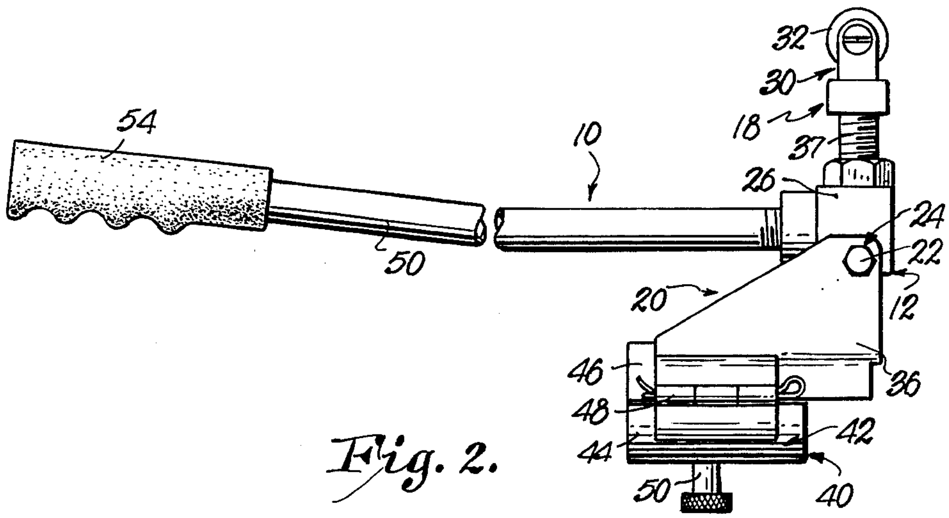
FIG. 2 is an elevational view showing one side thereof.
Figure 3:
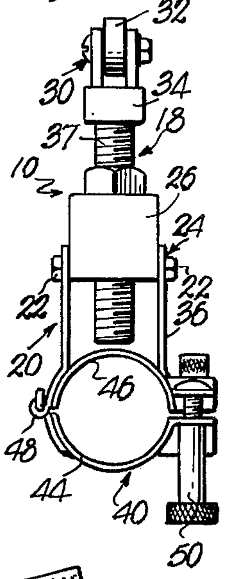
FIG. 3 is an end view thereof.
Figure 4:
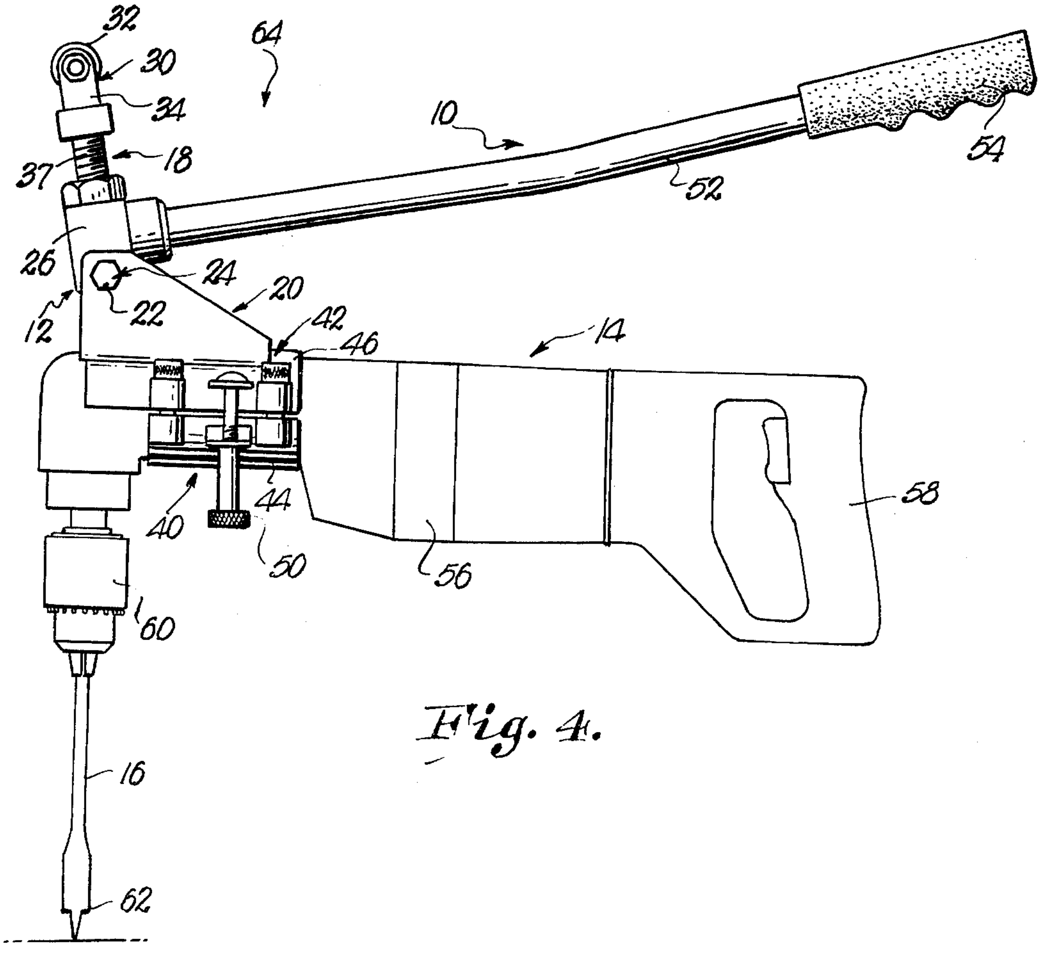
FIG. 4 is an elevational view illustrating the opposite side thereof and shown secured to a right-angle drill motor.
Figure 5:
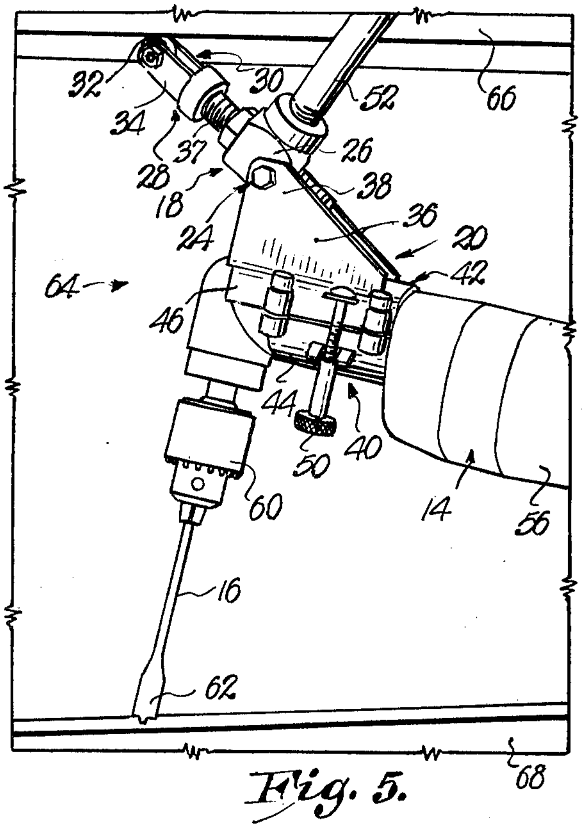
FIG. 5 is a partial perspective view of the attachment and drill motor of FIG. 4, showing the toggle linkage in its buckled position, and positioned between a pair of parallel, spaced abutments.
Figure 6:
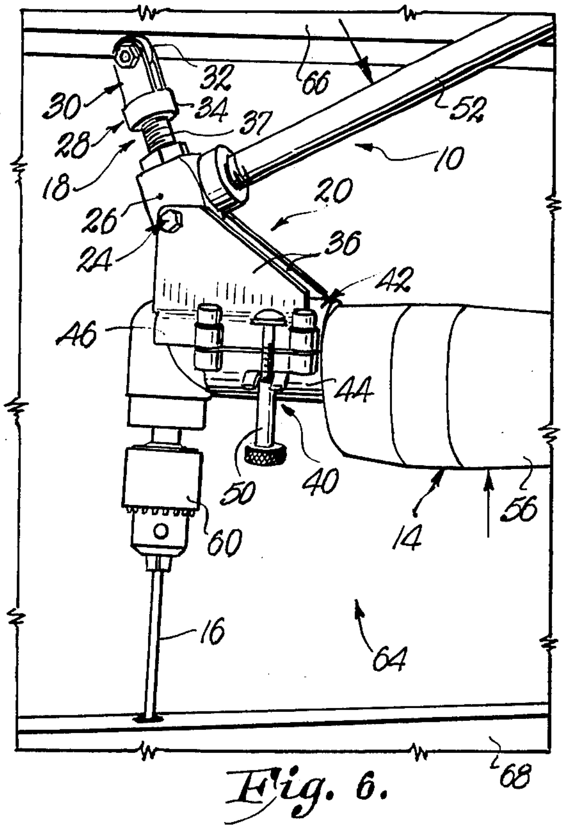
FIG. 6 is a partial perspective view as in FIG. 5 showing the toggle linkage in its extended position and the drill bit partially penetrating one of the spaced abutments.

In FIGS. 1 through 6, there is shown an attachment 10 adapted for securement to hand-held power instruments and the like and including a toggle joint 12. The attachment 10 is shown in FIGS. 4–6 mounted on a right-angle drill motor 14 having an elongate boring bit 16, though it is to be understood that the attachment 10 could be used in cooperation with substantially any type of hand instrument having a work performing tool associated therewith. Thus for example, the attachment 10 might be used in connection with a disc sander, power router, or circular saw. The applicant has found that the attachment is extremely beneficial when used in association with the right-angle drill motor as shown, and hence, this particular application of the invention will be described in detail throughout the remainder of the Specification.

The toggle joint 12 comprises a pair of links 18 and 20 respectively, coupled together at one end by a pivot 22 to present a knee 24. Thus, the links 18 and 20 are swingable relative to one another about the knee 24 to effect extension and buckling of the toggle joint 12.

The link 18 presents a substantially elongate configuration having an end 26 pivotally coupled to link 20 at the knee 24 and an opposed work engaging end 28 including a roller assembly 30. The roller assembly 30 includes a hard metal roller 32 supported by a bifurcated bracket 34 for rotation about an axis extending transversely of the link 18. In the preferred embodiment, the bracket 34 is threaded for adjustable engagement with mating threads 37 on the body of link 18 such that the effective length of the link 18 may be selectively adjusted.

The link 20 comprises a pair of parallel, laterally spaced, triangular brackets 36 each having a vertex 38 coupled with end 26 of link 18 at the knee 24. The brackets 36 are rigidly secured along one side to a connecting means in the form of a clamp 40.

The clamp 40 includes a cylindrical, tubular gripping body 42 defined by a pair of opposed hemicycle sections 44 and 46, pivotally coupled to one another by a hinge 48 for relative swinging movement to open and close the gripping body 42. The clamp 40 has a releasable clasp 50 extending between the sections 44 and 46 such that the latter may be locked in a position to close the gripping body about a clamped object.

An elongate leverage member 52 is secured to the end 26 of link 18 and extends substantially perpendicularly relative to the elongate axis of the latter. The member 52 is slightly bowed along its length and has a resilient handle grip 54 secured to the end remote from link 18.

As shown in FIG. 4, the drill motor 14 is of conventional construction, having an elongate body 56, a handle 58 at one end of the body 56, and a chuck 60 supported at the opposite end of body 56 for rotation about an axis extending perpendicularly of the body 56. Of course, boring bit 16 is releasably held in the chuck 60 for rotation with the latter, whereby a cutting action is applied at the working end 62 of the bit 16.

Normally, the attachment 10 is combined with the drill motor 14 in a manner illustrated in FIG. 4 to collectively form a drilling implement 64. The clamp 40 is secured around body 56 of the drill motor 14 in such a manner that the axis of rotation of the chuck 60 and drill bit 16 passes through the knee 24 of toggle joint 12. Thus, the boring bit 16 may be considered an extension of the link 20 such that the bit 16 is included in the action of toggle joint 12.

In use, the drilling implement 64 is positioned between a pair of parallel, spaced abutments 66 and 68 with the roller 32 on link 18 positioned against abutment 66 and the working end 62 of bit 16 in contact with the abutment 68. It is necessary that the toggle joint 12 be in a buckled condition when the implement 64 is so positioned between the abutments 66 and 68; the disposition of toggle joint 12 may be adjusted within limits by extending or retracting link 18 in a manner described herein above. Preferably, the length of link 18 is adjusted such that when the implement 64 is positioned between the abutments 66 and 68 the angle between the axis of rotation of bit 16 and the elongate axis of link 18 will be greater than 90 degrees yet somewhat less than 180 degrees. It will be appreciated that the operator can most easily manipulate the implement 64 into the above described position by supporting the implement 64 with one hand on handle grip 54 and the other hand on 58.

With the implement 64 properly positioned between abutments 66 and 68, drill motor 14 is actuated to effect power rotation of chuck 60 and drill bit 16. At the same time, the operator forces leverage member 52 and body 56 toward one another as shown, for example, by the arrows in FIG. 6, thereby swinging the links 18 and 20 about the knee 24 causing extension of the toggle joint 12. By virtue of the action of toggle joint 12, there is exerted an increasing pressure on the abutments 66 and 68 as leverage member 54 and body 56 are forced together. The force on abutment 66 through working end 62 of the bit 16 provides the necessary drilling force such that the bit 16 bores into the abutment 68.

When the bit 16 has penetrated abutments 68 to a desired depth (normally a through hole would be desired), leverage member 52 and body 56 are swung away from one another by buckling the toggle joint 12 and permitting the bit 16 to be withdrawn from the abutment 68.

Of course, the above described operation may be repeated any number of times and is particularly advantageous when boring clearance holes for electrical wires or the like through a series of parallel, equally spaced floor joists or wall studs. When so used, the length of link 18 need be adjusted only a single time such that the clearance holes may be drilled easily in a minimum amount of time.

Figure 7:
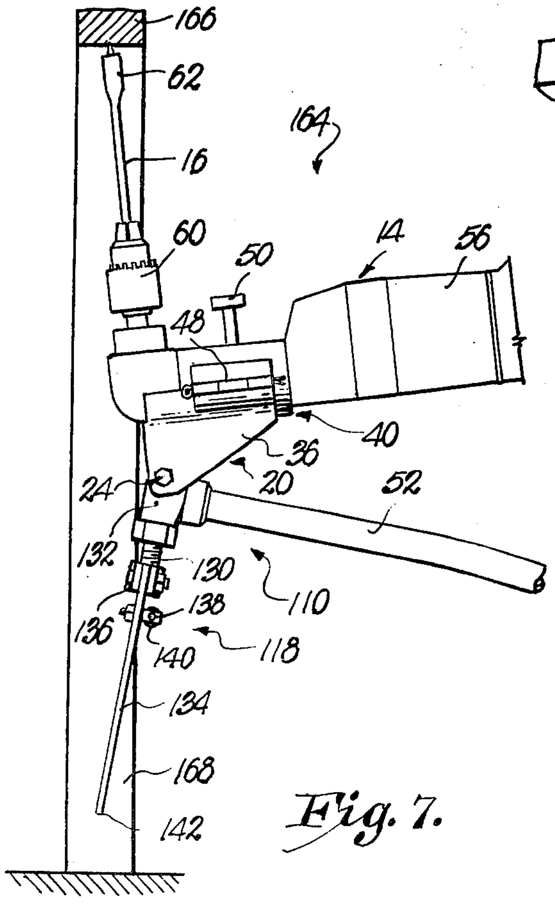
FIG. 7 is a partial side elevational view of a second embodiment of the present invention, showing the attachment and drill positioned between a pair of abutments which extend perpendicularly to one another.
Figure 8:
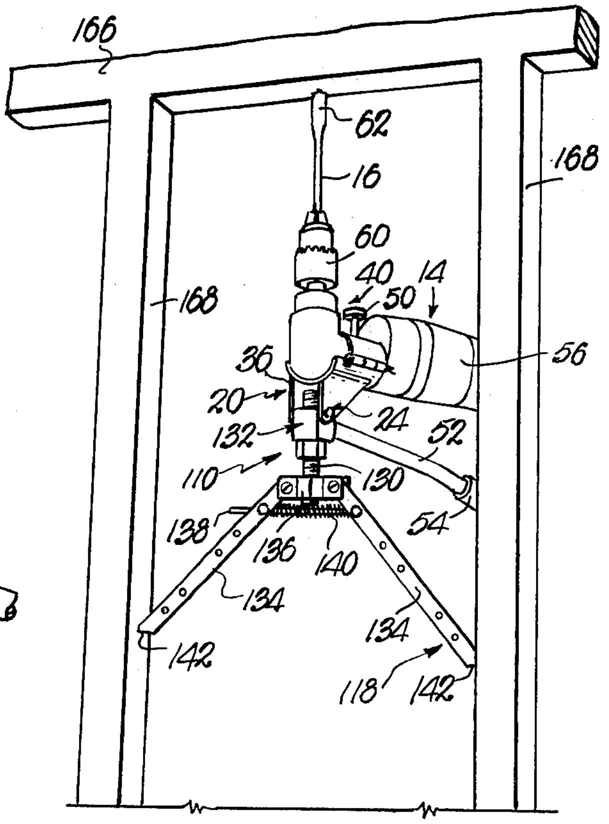
FIG. 8 is a perspective view of the attachment and drill motor shown in FIG. 7.

In FIGS. 7 and 8, there is shown a second embodiment of the present invention, which is particularly adapted for use with abutments which extend perpendicularly to one another.

An attachment 110 is shown secured to a drill motor 14 to form a drilling implement 164. The attachment 110 is substantially identical to the attachment 10 described herein above with the exception that the attachment 110 has a bifurcated link 118 in place of the link 18 of attachment 10.

As shown in FIG. 8, the link 118 comprises a short rod 130 having an end 132 coupled with the link 20 at knee 24 and supporting leverage member 52 in a substantially perpendicular relationship to the axis of rod 130. The link 118 also includes a pair of arms 134 pivotally mounted on rod 130 at an end 136 opposed from the end 132. A connecting bar 138 extends between the arms 134 and has a coil spring 140 concentrically supported thereon for yieldably biasing the arms 134 away from one another. Relatively sharp retaining points 142 are provided at the outermost ends of the respective arms 134 for the purpose of gripping an abutment in a manner to be described herein below.

The operation of the drilling implement 164 is substantially the same as the previously described operation of implement 64 with the exception that the implement 164 is normally used between an abutment 166 and a plurality of abutments 168 which extend perpendicularly to the abutment 166. Thus, the implement 164 is normally positioned as shown for example in FIGS. 7 and 8 such that the retaining points 142 engage abutments 168 and the working end 62 of drill bit 16 is in engagement with abutment 166. As with the initial positioning of implement 64, it is necessary that the implement 164 be initially disposed such that the toggle joint 12 assumes a buckled position. Note that it is not necessary to provide for adjustability of the length of bifurcated link 118 since the desired degree of buckling of the joint 12 may be accomplished by simply positioning the retaining points 142 and in appropriate location along the length of abutments 168.

With the implement 164 so positioned, the leverage member 52 is forced toward the body 56 of drill motor 14 in exactly the same manner as described for the operation of the drilling implement 64. During this actuation, the engagement of points 142 with their respective abutments 168 prevent relative movement between the latter and the points 142 such that the toggle joint is caused to extend thereby effecting a drilling force against abutment 166 at the working end 62 of boring bit 16.

While the invention has been described in terms of an attachment 10 or 110 for a drill motor 14 to form a drilling implement 64 or 164, it will be appreciated that either the implement 64 or 164 could be of unitary construction wherein the structure represented by attachments 10 or 110 would be made an integral part of the drill motor 14. Of course, this same unitary construction would also be applicable to the previously mentioned instruments such as disc sanders, power routers and the like.

From the foregoing, it can be seen that the present invention offers the unique means for applying a working force to a hand implement or the like to engagement with a pair of abutments. Such a device offers countless advantages to the construction and manufacturing industries, in terms of savings in time and reduction of operator fatigue.

The unique toggle linkage action of the implement 64 permits the operator to apply the necessary drilling force to the boring bit 16 even in cramped, limited access working areas without requiring the operator to assume an awkward and tiring position during the drilling operation. In this connection, the applicant has found that the present invention is particularly useful in drilling clearance holes in extremely hard to reach areas, such as under counter tops, behind cabinets, and adjacent corners in small closets, and the like.

Having thus described the invention, what is claimed as new and desired to be secured by Letters Patent is:

1. An attachment for an instrument having a tool secured thereto, said tool having an outermost tip, said attachment comprising:

a toggle joint including a pair of rigid links pivotally interconnected for relative swinging movement, presenting a knee, one of said links being adapted for connection with said instrument and the other of said links having a pressure-exerting end; and means for rigidly connecting said one link to said instrument to effectively form a rigid extension of said one link, whereby said tip of the tool will define one point of the toggle joint, said knee will define a second, middle point of the toggle joint, and said end of the other link will define a third point of said toggle joint, said links being normally disposed out of alignment such that when they are swung relatively at the knee between a pair of spaced abutments and in a direction tending to align said three points, said tip of the tool will exert pressure on one of the abutments and said end of the other link will exert pressure on the other of said abutments.

2. The invention of claim 1; and an elongated leverage member rigidly connected to said other link for effecting said swinging movement.

3. The invention of claim 2, said member having a connection with said other link adjacent the knee.

4. The invention of claim 2, said other link being elongated, the longitudinal axis of the member and that of said other link being angularly offset relative to each other.

5. The invention of claim 1, said connecting means comprising a releasable clamp for rendering said one link removable from the instrument.

6. The invention of claim 1, said other link being extensible to accommodate for abutments of varying spacings.

7. The invention of claim 1, said instrument supporting said tool for rotation of the latter, said other link having a longitudinal axis movable to and from a position in alignment with said axis of rotation.

8. The invention of claim 1, said other link having a pair of arms engageable with the other abutment.

9. The invention of claim 1, said other link having a roller rotatably supported on the link and adapted for engagement with said other abutment.

10. An implement comprising:

a toggle joint including a pair of rigid links pivotally interconnected for relative swinging movement, presenting a knee, one of said links having an instrument rigidly secured thereto to effectively form a rigid extension of said one link and the other link having a pressure-exerting end, said instrument having a tool provided with an outermost tip that defines one point of the toggle joint while said knee defines a second, middle point of the toggle joint and said end of the other link defines a third point of the toggle joint, said links being normally disposed out of alignment such that when they are swung relatively at the knee between a pair of spaced abutments and in a direction tending to align said three points, said tip of the tool will exert pressure on one of the abutments and said end of the other link will exert pressure on the other of said abutments.

* * * * *